Patented Dec. 19, 1933

1,940,646

UNITED STATES PATENT OFFICE 1,940,646

INSECTICIDE AND PROCESS OF MAKING THE SAME

Dudley H. Grant, New York, N. Y., assignor to Standard Oil Development Company, a corporation of Delaware No Drawing. Application October 19, 1927
Serial No. 227,361

13 Claims. (Cl. 167—24)

This invention relates to improvements in insecticides or insect repellents and methods of making them. The invention deals particularly with compositions containing the active principle of pyrethrum (*Pyrethrum cinerarifolium* and allied species).

My process involves the use of a solvent containing an organic solvent and a blending agent, with or without other substances which may include water and one or more emulsifying agents, all as hereinafter described. This composite solvent may be used for the direct preparation of finished insecticidal compositions from dry or moist vegetable matter containing an insecticidal principle, for example, derris, cube, and tephrosia. Alternatively the solvent may be used to prepare solutions for concentration or dilution, and in other ways.

As the organic solvent I prefer to use naphtha, kerosene, or a light lubricating oil. The agent for blending or making homogeneous the petroleum distillate or other organic solvent with water is preferably an oil soluble sulfonate, such as may be formed by neutralizing oil which has been subjected to the action of fuming sulfuric acid. The oil soluble sulfonates are extracted from the oil by a solvent and are suitably separated from it. In general, one or more other emulsifying or blending agents are combined with the sulfonate, for example, Turkey red oil, rosin soap, sulfonated vegetable or mineral oils, steam distilled pine oil, terpineol, cresol, cyclohexanol, dichlorobenzene, chloronaphthalene, one or more of the higher alcohols, such as isopropyl or secondary butyl or secondary amyl alcohol, ketones, or cyclohexanol or its homologues. Some of the above materials may serve both as blending agents and as emulsifying agents. Such materials having this dual property are oil soluble sulfonates, Turkey red oil, sulfonated vegetable or animal oils and to a certain extent also rosin soap. However, it should be explained that even though my solvent to be used for the extraction contains an emulsifying agent yet it is clear and homogeneous while being used for the extraction and does not become emulsified until the extraction has been completed and the solution is mixed with water in preparation for use.

The following composite solvents are given in illustration of the invention:

I Composition

| | |
|---|---|
| Kerosene | 31.6 c.c. |
| Oil soluble sulfonate | 18.4 c.c. |
| Water | 2.0 c.c. |

II

| | |
|---|---|
| Kerosene | 31.6 c.c. |
| Oil soluble sulfonate | 18.4 c.c. |
| Secondary butyl alcohol | 10.0 c.c. |
| Water | 68.0 c.c. |

III

| | |
|---|---|
| Kerosene | 31.0 c.c. |
| Oil soluble sulfonate | 18.0 c.c. |
| Ethyl methyl ketone | 10.0 c.c. |
| Water | 35.0 c.c. |

IV

| | |
|---|---|
| Petroleum white oil (vis. 75–85 sec. Saybolt at 100° F.) | 45.0 c.c. |
| Oil soluble sulfonate | 5.0 c.c. |
| Dichlorobenzene (crude) | 9.5 c.c. |
| Water | 2.0 c.c. |

V

| | |
|---|---|
| Mineral seal oil | 171.3 c.c. |
| Oil soluble sulfonate | 30.2 c.c. |
| Potash rosin soap | 10.0 gm. |
| Hexahydrophenol | 10.0 c.c. |
| Ethyl methyl ketone | 10.0 c.c. |
| Cresol, U. S. P | 10.0 c.c. |
| Water | 24.0 c.c. |

VI

| | |
|---|---|
| Petroleum white oil (vis. 75–85 sec. Saybol at 100° F.) | 128.0 c. c. |
| Oil soluble sulfonate | 14.2 c. c. |
| Secondary amyl alcohol | 6.6 c. c. |
| Steam distilled pine oil | 6.6 c. c. |
| Chloronaphthalenes (crude) | 6.6 c. c. |
| Potash rosin soap | 8.6 gm. |
| Water | 17.5 c. c. |

It will be noted that these compositions do not contain free alkali.

The extraction is carried out according to any approved method, as by maceration or percolation. After the extraction the spent pyrethrum flowers are removed. The extract, which is usually in the form of a clear solution, is ready for use with or without dilution. For application to growing plants the extract should ordinarily be diluted with from about 50 to 200 parts of water.

The composite solvents described have a tolerance for water and are especially adapted to extract active principles from moist substances. Some of the water may be expelled as by gentle heating, if desired, but satisfactory extraction can be obtained without any special drying.

If a concentrate is to be prepared, some or all of the volatile constituents is removed from the extract by distillation, preferably at reduced pressure. There remains an active body (oleo-resin) commingled with oil soluble sulfonate, with or without other substances. This mixture may be readily emulsified with water when required for use. The percentage of oleo-resin may vary between 3% and 40% by weight and the percentage of oil soluble sulfonate from 97% to 60%. For application to growing plants, about 25 to 500 parts of water should be added to one part of the concentrate.

The improved insecticides described herein are effective against plant lice, caterpillars, beetles, and many other phytophagous predacious or parasitic insects.

While I prefer to use solvents containing petroleum oil and water, as above described, the active principles may be extracted with other solvents, for example, alcohols (ethyl, isopropyl, etc.), benzol, or carbon tetrachloride. The extract so prepared may be concentrated to yield an oleo-resin which may be mixed with oil soluble sulfonate in suitable percentages for instance those above stated. Various substances may be added to the composition either before or after the organic material is extracted, and before or after concentration by evaporation or distillation. Phenols, cresols, pine oil, etc. are suitable for this purpose.

A desirable source of extraction agent containing oil soluble sulfonates is the isopropyl alcohol used in commercial practice to wash acid-treated heavy oils at the stage following the neutralization of the oil with an alkali. The alcohol dissolves the oil soluble sulfonates in the oil. Pyrethrum flowers and the like are extracted with this alcohol solution, the spent flowers are removed, and the solution concentrated, leaving a residue of pyrethrum extractives mixed with oil soluble sulfonates.

If there is free alkali in the isopropyl alcohol solution, it should be neutralized. Rosin or rosin oil is especially suitable for this purpose.

The invention is not limited to the precise compositions and procedures described above, and various changes and modifications may be made within the scope of the appended claims, in which it is my intention to claim all novelty inherent in the invention as broadly as the prior art permits.

I claim:

1. An insecticide or insect repellent containing an insecticidal oleoresin of pyrethrum and an oil soluble alkali metal salt of sulfonic acid derived from petroleum.

2. An insecticide containing an active principle of pyrethrum, a hydrocarbon oil, and an oil soluble sulfonate derived from petroleum.

3. An insecticide containing an active principle of pyrethrum, a hydrocarbon oil, secondary alcohol, water, and an oil soluble sulfonate derived from petroleum.

4. A solvent for an oleoresin of pyrethrum and comprising kerosene, water, and an oil soluble sulfonate derived from petroleum.

5. A solvent for an oleoresin of pyrethrum derived from petroleum and comprising about 31.6 volumes of kerosene, 18.4 volumes of oil soluble sulfonate, 10 volumes of secondary butyl alcohol, and 68 volumes of water.

6. An insecticide containing from about 3% to 40% by weight of an oleoresin of pyrethrum and from about 97% to 60% by weight of an alkali metal sulfonate derived from petroleum.

7. In the manufacture of insecticides, the improvement which comprises extracting pyrethrum flowers with a solvent containing an oil soluble sulfonate derived from petroleum.

8. In the manufacture of insecticides, the improvement which comprises extracting pyrethrum flowers with a solvent containing an oil soluble sulfonate derived from petroleum, and removing the solvent.

9. In the manufacture of insecticides, the improvement which comprises extracting pyrethrum flowers with a solvent containing an oil soluble sulfonate derived from petroleum, distilling off the solvent, and emulsifying the residual composition with water.

10. In the manufacture of insecticides the improvement which comprises extracting pyrethrum flowers with a mixture of an organic solvent, a blending agent and an emulsifying agent.

11. The process according to claim 10, in which water is admixed with the mixture before carrying out the extraction.

12. In the manufacture of insecticides, the improvement which comprises extracting the active insecticidal principles from vegetable matter of the group consisting of pyrethrum, derris, cube, and tephrosia, with a mixture of an organic solvent, a blending agent and an emulsifying agent.

13. In the manufacture of insecticides according to claim 12, in which the emulsifying agent is an oil-soluble sulfonate derived from petroleum.

DUDLEY H. GRANT.